W. A. TURBAYNE.
ELECTRICAL SYSTEM OF DISTRIBUTION.
APPLICATION FILED DEC. 29, 1908.
991,108.
Patented May 2, 1911.
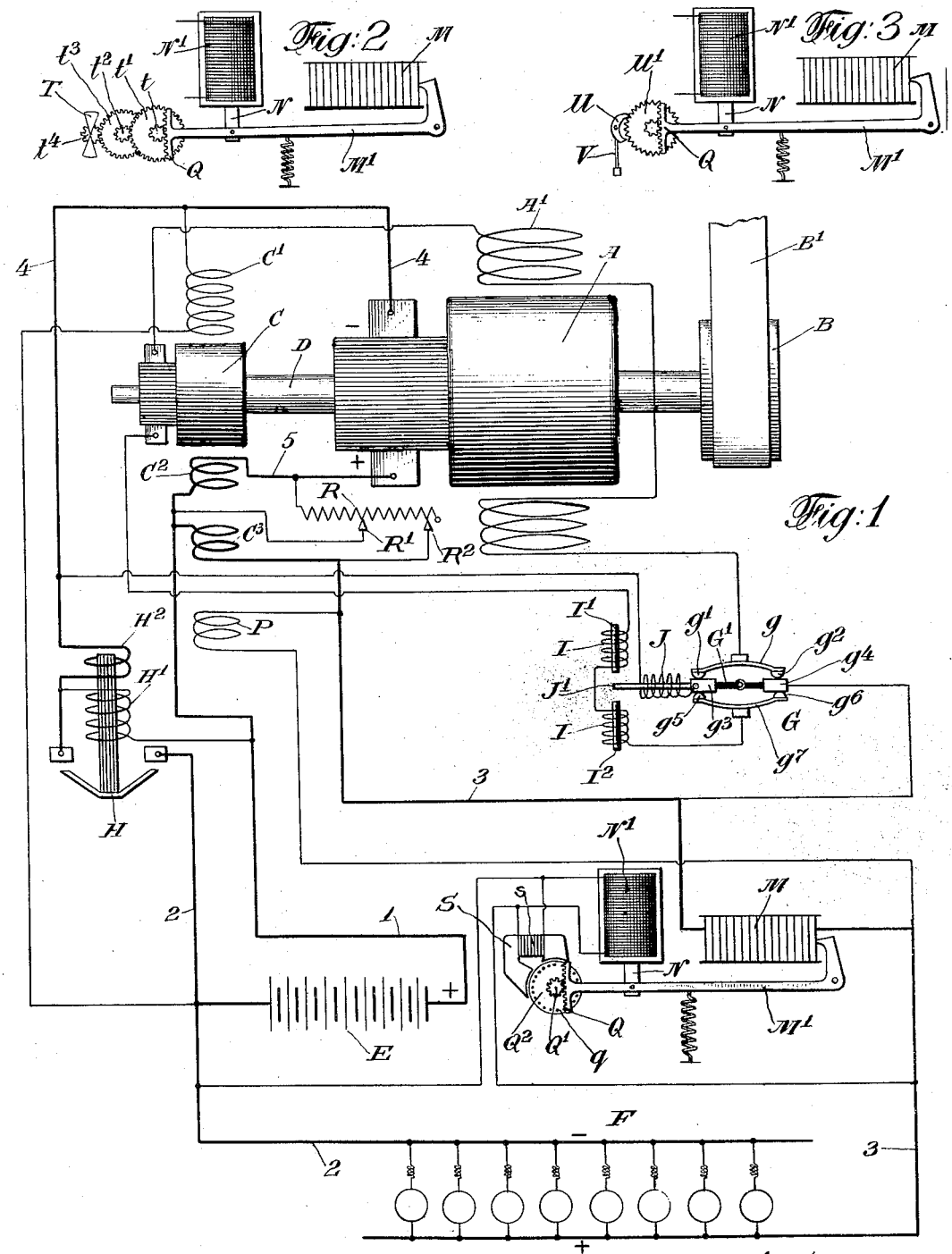

UNITED STATES PATENT OFFICE.

WILLIAM A. TURBAYNE, OF LANCASTER, NEW YORK, ASSIGNOR TO GOULD COUPLER COMPANY, A CORPORATION OF NEW YORK.

ELECTRICAL SYSTEM OF DISTRIBUTION.

991,108.  Specification of Letters Patent.  Patented May 2, 1911.

Application filed December 29, 1908. Serial No. 469,773.

*To all whom it may concern:*

Be it known that I, WILLIAM A. TURBAYNE, a citizen of the United States, and a resident of Lancaster, in the county of Erie, State of New York, have invented certain new and useful Improvements in Electrical Systems of Distribution, of which the following is a specification.

My invention relates to electrical systems of distribution and more especially to systems in which there is a main dynamo feeding a work circuit and in which automatic means are provided for regulating the main dynamo or generator.

I have especially designed my improvements with relation to systems in which a main generator is driven at a variable speed and is regulated by an auxiliary dynamo and in which a storage battery is operatively arranged to feed a consumption or work circuit when the main generator is inoperative or is not supplying sufficient voltage.

One of the objects of my invention is to provide an especially economical and efficient means for maintaining the voltage at the work circuit or load substantially constant irrespective of whether the battery or the main generator is feeding the work circuit.

A further object is to regulate the auxiliary dynamo in such a manner that it will regulate the main generator so that a substantially constant voltage will be supplied thereby to the load on the consumption circuit or so that the generator voltage will only rise with the battery voltage.

Further objects, features and advantages will more clearly appear from the detailed description given below taken in connection with the accompanying drawing in which—

Figure 1 shows diagrammatically a system embodying one form of my improvements and Figs. 2 and 3 show modified details.

Referring to the drawing A represents a main generator driven at a variable speed by the pulley B which in turn is driven by the belt B' from any convenient source of energy. When applied to car lighting systems this source of energy may be the car axle.

C represents an auxiliary dynamo connected to the main generator A by means of a shaft D.

E represents a storage battery connected between the positive and negative busses 1 and 2 respectively.

F represents a work circuit connected between the positive and negative busses 3 and 2 respectively. The negative brush of the main generator A is connected to the negative bus 2 by means of a conductor 4 and switch H. The positive brush of the main generator A is connected to the busses 1 and 3 by means of a conductor 5. Connected across the terminals of the switch H is a field coil C' for the auxiliary dynamo C. In series in the conductor 5 is a field coil $C^2$ and in series with the bus or conductor 3 is a field coil $C^3$. Both field coils $C^2$ and $C^3$ are upon the auxiliary generator C.

R represents a resistance connected to the positive terminal of the main generator A and arranged to act as shunts for the coils $C^2$ and $C^3$. The value of these shunts may be varied by movement of the switch contacts R', $R^2$. The main generator A is provided with field coils A', one terminal of which is connected to one brush of the auxiliary dynamo C and the other terminal of which is connected to the spring contact $g$ of the automatic switch G. The automatic switch G consists of two spring contacts $g$ and $g^7$. Spring $g$ is provided with contacts $g'$ and $g^2$. Spring $g^7$ is provided with contacts $g^5$ and $g^6$.

G' represents a pivoted arm carrying the contacts $g^3$ and $g^4$ insulated from each other. The pivoted arm G' also carries a magnetizable member J' polarized by the coil J. Acting upon the polarized member J' are two magnetizable members I', $I^2$ energized by coils I. The coils I are connected in series in a circuit from the spring $g^7$ to the other brush of the auxiliary generator C. Contact $g^4$ is connected with the positive side of the work circuit F. Coil J is connected in a circuit from the contact $g^3$ to the conductor 4 or the negative side of the main generator A.

The switch H is provided with a voltage coil H' connected between the conductor 4 and the conductor 1. The switch is also provided with a current coil $H^2$ connected in series with the conductor 4.

The various portions of the systems are shown in the positions they occupy when the system is about to be started up. The switch H is open and the work circuit is being fed from the battery. The coil C' of the auxiliary generator is energized from the battery, the terminals of the coil being connected across the battery through the generator A. At this time also the auxiliary generator C is connected in a local circuit with the field winding A′ of the main dynamo, the circuit being from the upper brush of the auxiliary generator, through the field winding A′, thence through the spring $g$ to contacts $g'$ and $g^2$, carried thereby, thence through the contacts $g^3$ and $g^4$ of the pivoted member G′ to the contacts $g^5$ and $g^6$ carried on the spring $g^7$, thence through coil 1 to the lower brush of the auxiliary generator. Thus when the machines are started the auxiliary generator will excite the main generator, and since both generators rotate in the same direction the positive terminal of the main generator will always be on the same side.

Upon development of an electromotive force by the main dynamo a current is developed in the local circuit which includes the conductor $j$, coil J, contacts $g^3$, $g'$, and $g^5$, springs $g$ and $g^7$, contacts $g^2$, $g^6$ and $g^4$ and conductor $j'$. This current energizes a magnetizable member J′, extending from the pivoted switch member G′. The arm J′ will be attracted upwardly or downwardly by the magnetizable members I′ or I² according to the direction of the current from the auxiliary dynamo. If the arm J′ moves upward then the contact arm G′ will swing so that the contact is broken between $g^3$ and $g^5$ and between $g^2$ and $g^4$, whereas if it is attracted downward the contact arm G′ will break contact between $g'$ and $g^3$ and between $g^4$ and $g^6$. These connections throw the field A′ in circuit with the main generator A and cause the field A′ to be very rapidly built up.

When the electromotive force of the main generator has reached its normal value the switch H is closed by the action of the voltage coil H′. This throws the work circuit and battery in series with the main generator and a heavy current passes through the field coils C² and C³. At the same time the coil C′ is short-circuited and it will then have practically no effect as an exciting element. The field coils C² and C³ are wound to oppose each other but the coil C² is arranged to produce the greater magnetomotive force. The coil C² is also wound to oppose the coil C′. Therefore, upon the closing of the switch H the magnetomotive force of the coil C² predominates and reverses the polarity of the auxiliary generator C and causes it to become a counter machine in the field circuit A′ to cut down the electromotive force of the main generator A. As the voltage of the main generator rises with increase of speed the current through coil C² increases responsively thereto, and in turn increases the counter-electromotive force of the auxiliary dynamo in series with the main generator fields A′, thus cutting down the field strength of the main generator A to bring its voltage back to substantially the proper value. The coil C³ tends to oppose this action but when the voltage of the main generator rises above the value which will produce a floating condition of the battery, the battery receives considerable charging current which does not pass through the coil C³. The action of the field coil C² is therefore increased in much greater proportion than the action of its opposing field coil C³. The result of this action is that as the charging current of the battery increases the coils C² and C³ act through the auxiliary dynamo C to decrease the field strength of the main generator A, and, therefore, keep the voltage of the main generator A down to its proper value and to maintain the charging current at its proper value. The shunt resistance R and switch contacts R′ and R² are adjusted to regulate the coöperating action of the field coils C² and C³ and by means thereof the action of these field coils C² and C³ may be adjusted to produce any desired effect.

Connected in series in the bus or conductor 3 is a carbon pile resistance or rheostat M. This resistance is, therefore, connected in series with the work circuit and in circuit between the battery and the work circuit. This carbon pile resistance M is operated by means of a lever M′ connected to a core N of a solenoid N′. The coil or solenoid N′ is connected directly across the work circuit F and is responsive to fluctuations of voltage thereof. Connected across the terminals of the carbon pile resistance M is a field coil P upon the auxiliary dynamo C. The field coil P is arranged to vary the field strength of the auxiliary dynamo C and to thereby cause proper regulation of the main generator A.

If the voltage at the work circuit tends to rise the strength of the solenoid N′ is increased thereby releasing the pressure of the carbon pile resistance M to increase its resistance and to increase the drop of potential between the battery and work circuit. The potential applied to the load on the work circuit will thereby be maintained substantially constant. During this operation, however, the voltage between the battery and work circuit, or across the carbon pile resistance M is increased, so that the current in coil P is increased thereby increasing the coaction of the auxiliary dynamo C to further decrease the voltage supplied by the main generator A. The field coil P being connected in shunt to a resistance in the consumption circuit is therefore responsive to current or load changes therein. That is, since the voltage across the resistance varies with variations of current therein the strength of the coil P also varies with variations of load on the circuit unless counteracted by variations in the resistance itself. This has the effect of keeping the generator voltage down somewhat and thus cutting down the battery charging current and keeping the total load on the main generator within desired limits. The action of the solenoid N' upon the variable resistance M causes the field coil P to be responsive to voltage fluctuations at the load.

The efficiency and practical operation of the carbon pile resistance M depends largely upon the mechanical design and operation thereof and its non-responsiveness to jars and shocks. In order to provide for these features I place on the end of the lever M' a rack Q which engages a pinion Q' secured to an iron cylinder with short-circuited windings $q$. The iron cylinder $Q^2$ is arranged to rotate within a magnetic field produced by the electro-magnet S having a field coil $s$ connected across the circuit 2, 3. This apparatus forms a magnetic damper which effectively prevents sudden shocks and jars from deleteriously effecting the carbon pile resistance M.

In Fig. 2, I show another arrangement of damping the movement of the lever M' in which the rack Q operates a fan T by means of the gears or pinions $t$, $t'$, $t^2$, $t^3$ and $t^4$. The amount of damping can be adjusted by varying the size and relationship of the gears $t$, $t'$, $t^2$, $t^3$ and $t^4$.

Fig. 3 represents still another method of producing a damping action, in which the rack Q is arranged to operate pawl and ratchet mechanism U, U', the amount of damping being regulated by the size of the pendulum V attached to the pawl U.

From the above it will be apparent that I have provided an exceptionally efficient and economical means for regulating the main generator by means of an auxiliary dynamo responsive both to voltage and current fluctuations and in which the fluctuation of voltage at the load is maintained at a minimum.

Although I have described my improvements in great detail I do not desire to be limited to such details but Having fully and clearly described my invention what I claim as new and desire to secure by Letters Patent, is:

1. The combination of a source of electromotive force, an electric circuit fed thereby, an auxiliary dynamo-electric machine for governing said source, a variable resistance in series with the work circuit, means for regulating said dynamo responsive to variations in said resistance and means for controlling said resistance responsive to voltage fluctuations.

2. In combination, a generator, a work circuit fed thereby, a storage battery connected in operative relation thereto, an auxiliary dynamo for regulating said generator, a device for regulating the difference in voltage between said work circuit and said battery, and means for varying the action of said dynamo responsive to electrical variations in said device.

3. In combination, a generator, a work circuit fed thereby, a storage battery connected in operative relation thereto, an auxiliary dynamo for regulating said generator, a variable resistance for regulating the difference of voltage between the work circuit and battery and a coil for regulating the field of said dynamo responsive to electrical variations in said resistance.

4. In combination, a generator, a work circuit fed thereby, a storage apparatus in operative relation therewith, an auxiliary dynamo for regulating said generator, means for regulating the voltage applied to the work circuit responsive to voltage changes thereof and a coil for regulating said dynamo responsive to electrical variations in said means.

5. In combination, a generator, a work circuit fed thereby, a storage apparatus in operative relation therewith, an auxiliary dynamo for regulating said generator, a carbon pile resistance for maintaining the voltage applied to said work circuit substantially constant, and means for regulating said dynamo responsive to electrical variations in said resistance.

6. In combination, a generator driven at a variable speed, a work circuit fed thereby, a storage battery in operative relation thereto, an auxiliary dynamo for regulating the voltage of the generator, a carbon pile resistance for regulating the difference of potential between the battery and work circuit and a coil for regulating said dynamo responsive to the electrical variations in said resistance.

7. In combination, a generator, a work circuit fed thereby, a storage battery in operative relation thereto, means whereby a difference in voltage exists between the battery and work circuit, an auxiliary dynamo for regulating the generator and means for regulating said dynamo responsive to fluctuations in the difference of voltage between said battery and work circuit.

8. In combination, a generator driven at a variable speed, a consumption circuit and its load fed thereby, a storage battery connected to said circuit, means whereby a difference in voltage exists between the battery and the consumption circuit, an auxiliary dynamo mechanically connected to said generator for regulating its output and a coil for regulating the field strength of the auxiliary dynamo responsive to fluctuations in the difference of voltage between the load and battery.

9. In an electrical system of distribution, a main generator driven at a variable speed, a consumption circuit and its load fed thereby, a storage battery connected thereto, an auxiliary dynamo for regulating the output of said generator, a variable resistance for regulating the voltage applied to the load responsive to voltage fluctuations at the load and means for regulating the auxiliary dynamo responsive to electrical fluctuations in said resistance.

10. In an electrical system of distribution, a main generator driven at a variable speed, a consumption circuit and its load fed thereby, a storage battery connected thereto, an auxiliary dynamo for regulating the output of said generator, a carbon pile resistance in circuit between the battery and load, said resistance carrying a current proportional to the current, a coil for controlling said resistance responsive to fluctuations of voltage at the load, and a coil for regulating the field strength of the auxiliary dynamo connected across and responsive to voltage fluctuations across said resistance.

11. In an electrical system of distribution, a main generator driven at a variable speed, an auxiliary dynamo arranged to decrease the field strength of the generator as its speed increases, a work circuit and its load and a storage battery arranged to be fed by the generator, means for regulating the voltage applied to the work circuit, and means dependent upon the action of said first mentioned means for regulating the action of the auxiliary dynamo to properly control the generator.

In testimony whereof, I have signed my name to this specification, in the presence of two subscribing witnesses.

WILLIAM A. TURBAYNE.

Witnesses:
RAYMOND HUMMELL,
W. H. PATTENDEN.